United States Patent
Nampoothiri et al.

(10) Patent No.: US 10,613,612 B2
(45) Date of Patent: Apr. 7, 2020

(54) POWER REDUCTION VIA MEMORY EFFICIENCY COMPENSATION

(71) Applicant: QUALCOMM Incorporated, San Diego, CA (US)

(72) Inventors: Sankaran Nampoothiri, Bangalore (IN); Subodh Singh, Bangalore (IN); Abhishek Ranka, Bangalore (IN); Avinash Philip, Bangalore (IN)

(73) Assignee: Qualcomm Incorporated, San Diego, CA (US)

( * ) Notice: Subject to any disclaimer, the term of this patent is extended or adjusted under 35 U.S.C. 154(b) by 214 days.

(21) Appl. No.: 15/461,195

(22) Filed: Mar. 16, 2017

(65) Prior Publication Data

US 2018/0267595 A1    Sep. 20, 2018

(51) Int. Cl.
| | |
|---|---|
| G06F 1/32 | (2019.01) |
| G06F 15/78 | (2006.01) |
| G06F 1/3234 | (2019.01) |
| G06F 1/324 | (2019.01) |
| G06F 1/3296 | (2019.01) |
| G06F 1/3225 | (2019.01) |

(52) U.S. Cl.
CPC .......... *G06F 1/3275* (2013.01); *G06F 1/324* (2013.01); *G06F 1/3225* (2013.01); *G06F 1/3253* (2013.01); *G06F 1/3296* (2013.01); *G06F 15/7807* (2013.01); *Y02D 10/126* (2018.01); *Y02D 10/14* (2018.01); *Y02D 10/151* (2018.01); *Y02D 10/172* (2018.01)

(58) Field of Classification Search
None
See application file for complete search history.

(56) References Cited

U.S. PATENT DOCUMENTS

| | | | |
|---|---|---|---|
| 6,167,484 A | 12/2000 | Boyer et al. | |
| 8,675,135 B2* | 3/2014 | Sano | G09G 5/14 |
| | | | 348/564 |
| 8,688,892 B2 | 4/2014 | Petersen et al. | |
| 8,812,886 B2 | 8/2014 | Ahn et al. | |
| 8,825,729 B1 | 9/2014 | Cope et al. | |
| 9,330,736 B2 | 5/2016 | Michalak | |
| 2015/0106649 A1 | 4/2015 | Kannan | |
| 2015/0293709 A1 | 10/2015 | Quach et al. | |
| 2015/0378424 A1 | 12/2015 | Anyuru | |
| 2016/0359973 A1* | 12/2016 | Loh | H04L 67/1097 |
| 2017/0083262 A1* | 3/2017 | Gadelrab | G06F 3/0613 |
| 2018/0203799 A1* | 7/2018 | Gaur | G06F 12/0811 |

OTHER PUBLICATIONS

International Search Report and Written Opinion—PCT/US2018/016473—ISA/EPO—dated Apr. 20, 2018.

* cited by examiner

*Primary Examiner* — Fahmida Rahman
(74) *Attorney, Agent, or Firm* — Patterson & Sheridan, L.L.P.

(57) ABSTRACT

Aspects of the present disclosure provide a method of operating a system-on-chip (SoC). The method includes determining efficiency of a memory of the SoC over a defined period of time, calculating an adjusted bandwidth for operating the memory based on the determined efficiency, and adjusting at least one of a voltage or a clock of the memory corresponding to the adjusted bandwidth.

26 Claims, 5 Drawing Sheets

POWER REDUCTION VIA MEMORY EFFICIENCY COMPENSATION

TECHNICAL FIELD

The teachings of the present disclosure relate generally to techniques for operating a system-on-chip (SoC), and more particularly, to power reduction in a SoC via memory efficiency compensation.

INTRODUCTION

Computing devices are ubiquitous. Some computing devices are portable such as mobile phones, tablets, and laptop computers. As the functionality of such portable computing devices increases, the computing or processing power required and generally the data storage capacity to support such functionality also increases. In addition to the primary function of these devices, many include elements that support peripheral functions. For example, a cellular telephone may include the primary function of enabling and supporting cellular telephone calls and the peripheral functions of a still camera, a video camera, global positioning system (GPS) navigation, web browsing, sending and receiving emails, sending and receiving text messages, push-to-talk capabilities, etc. Many of these portable devices include a SoC to enable one or more primary and peripheral functions on the specific device.

A SoC generally includes multiple central processing unit (CPU) cores embedded in an integrated circuit or chip and coupled to a local bus. The CPU cores may further be arranged into or more computing clusters. The SoC may further generally include hardware components and other processors.

Reduction of power consumption is a common goal for electronic systems. For example, transmission of data across buses between components of the electronic system may consume power. Reducing such power consumed in the transmission of data across buses may therefore reduce power consumption overall in the electronic system. For example, reducing the power utilized for transmission of data over buses in SoC applications, may reduce the overall power consumed by the SoC.

BRIEF SUMMARY OF SOME EXAMPLES

The following presents a simplified summary of one or more aspects of the present disclosure, in order to provide a basic understanding of such aspects. This summary is not an extensive overview of all contemplated features of the disclosure, and is intended neither to identify key or critical elements of all aspects of the disclosure nor to delineate the scope of any or all aspects of the disclosure. Its sole purpose is to present some concepts of one or more aspects of the disclosure in a simplified form as a prelude to the more detailed description that is presented later.

In some aspects, the present disclosure provides a method for operating a system on chip (SoC). The method generally includes determining efficiency of a memory of the SoC over a defined period of time, calculating an adjusted bandwidth for operating the memory based on the determined efficiency, and adjusting at least one of a voltage or a clock of the memory corresponding to the adjusted bandwidth.

In some aspects, the present disclosure provides an apparatus. The apparatus generally includes a memory and a memory controller configured to: determine efficiency of the memory over a defined period of time, calculate an adjusted bandwidth for operating the memory based on the determined efficiency, adjust at least one of a voltage or a clock of the memory corresponding to the adjusted bandwidth. The apparatus also generally includes a memory bus coupled between the memory and memory controller.

In some aspects, the present disclosure provides an apparatus. The apparatus generally includes a memory coupled with at least one processor, wherein the at least one processor is configured to: determine efficiency of the memory over a defined period of time, calculate an adjusted bandwidth for operating the memory based on the determined efficiency, adjust at least one of a voltage or a clock of the memory corresponding to the adjusted bandwidth.

In some aspects, the present disclosure provides an apparatus. The apparatus generally includes means for determining configured to determine efficiency of a memory of a memory in the apparatus over a defined period of time, means for calculating configured to calculate an adjusted bandwidth for operating the memory based on the determined efficiency, and means for adjusting configured to adjust at least one of a voltage or a clock of the memory corresponding to the adjusted bandwidth.

These and other aspects of the invention will become more fully understood upon a review of the detailed description, which follows. Other aspects, features, and embodiments of the present invention will become apparent to those of ordinary skill in the art, upon reviewing the following description of specific, exemplary embodiments of the present invention in conjunction with the accompanying figures. While features of the present invention may be discussed relative to certain embodiments and figures below, all embodiments of the present invention can include one or more of the advantageous features discussed herein. In other words, while one or more embodiments may be discussed as having certain advantageous features, one or more of such features may also be used in accordance with the various embodiments of the invention discussed herein. In similar fashion, while exemplary embodiments may be discussed below as device, system, or method embodiments it should be understood that such exemplary embodiments can be implemented in various devices, systems, and methods.

BRIEF DESCRIPTION OF THE DRAWINGS

So that the manner in which the above-recited features of the present disclosure can be understood in detail, a more particular description, briefly summarized above, may be had by reference to aspects, some of which are illustrated in the appended drawings. It is to be noted, however, that the appended drawings illustrate only certain typical aspects of this disclosure and are therefore not to be considered limiting of its scope, for the description may admit to other equally effective aspects.

DETAILED DESCRIPTION

The detailed description set forth below in connection with the appended drawings is intended as a description of various configurations and is not intended to represent the only configurations in which the concepts described herein may be practiced. The detailed description includes specific details for the purpose of providing a thorough understanding of various concepts. However, it will be apparent to those skilled in the art that these concepts may be practiced without these specific details. In some instances, well known structures and components are shown in block diagram form in order to avoid obscuring such concepts.

Although the teachings of this disclosure are illustrated in terms of integrated circuits (e.g., a SoC), the teachings are applicable in other areas. The teachings disclosed should not be construed to be limited to SoC designs or the illustrated embodiments. The illustrated embodiments are merely vehicles to describe and illustrate examples of the inventive teachings disclosed herein.

The various embodiments will be described in detail with reference to the accompanying drawings. Wherever possible, the same reference numbers will be used throughout the drawings to refer to the same or like parts. References made to particular examples and implementations are for illustrative purposes, and are not intended to limit the scope of the invention or the claims.

The terms "computing device" and "mobile device" are used interchangeably herein to refer to any one or all of servers, personal computers, smartphones, cellular telephones, tablet computers, laptop computers, netbooks, ultrabooks, palm-top computers, personal data assistants (PDA's), wireless electronic mail receivers, multimedia Internet enabled cellular telephones, Global Positioning System (GPS) receivers, wireless gaming controllers, and similar personal electronic devices which include a programmable processor. While the various aspects are particularly useful in mobile devices (e.g., smartphones, laptop computers, etc.), which have limited resources (e.g., processing power, battery, etc.), the aspects are generally useful in any computing device that may benefit from improved processor performance and reduced energy consumption.

The term "multicore processor" is used herein to refer to a single integrated circuit (IC) chip or chip package that contains two or more independent processing units or cores (e.g., CPU cores, etc.) configured to read and execute program instructions. The term "multiprocessor" is used herein to refer to a system or device that includes two or more processing units configured to read and execute program instructions.

The term "system on chip" (SoC) is used herein to refer to a single integrated circuit (IC) chip that contains multiple resources and/or processors integrated on a single substrate. A single SoC may contain circuitry for digital, analog, mixed-signal, and radio-frequency functions. A single SoC may also include any number of general purpose and/or specialized processors (digital signal processors, modem processors, video processors, etc.), memory blocks (e.g., ROM, RAM, Flash, etc.), and resources (e.g., timers, voltage regulators, oscillators, etc.), any or all of which may be included in one or more cores.

A number of different types of memories and memory technologies are available or contemplated in the future, all of which are suitable for use with the various aspects. Such memory technologies/types include phase change memory (PRAM), dynamic random-access memory (DRAM), static random-access memory (SRAM), non-volatile random-access memory (NVRAM), pseudostatic random-access memory (PSRAM), double data rate synchronous dynamic random-access memory (DDR SDRAM), and other random-access memory (RAM) and read-only memory (ROM) technologies known in the art. A DDR SDRAM memory may be a DDR type 1 SDRAM memory, DDR type 2 SDRAM memory, DDR type 3 SDRAM memory, or a DDR type 4 SDRAM memory. Each of the above-mentioned memory technologies include, for example, elements suitable for storing instructions, programs, control signals, and/or data for use in or by a computer or other digital electronic device. Any references to terminology and/or technical details related to an individual type of memory, interface, standard or memory technology are for illustrative purposes only, and not intended to limit the scope of the claims to a particular memory system or technology unless specifically recited in the claim language.

Mobile computing device architectures have grown in complexity, and now commonly include multiple processor cores, system-on-chips (SoCs), co-processors, functional modules including dedicated processors (e.g., communication modem chips, GPS receivers, etc.), complex memory systems, intricate electrical interconnections (e.g., buses and/or fabrics), and numerous other resources that execute complex and power intensive software applications (e.g., video streaming applications, etc.). With this rise in complexity, new memory management solutions may be needed to improve the computational and power management performance of mobile devices.

Dynamic random access memory (DRAM) (e.g., double data rate (DDR) memory) efficiency varies dynamically (50%-90%). DRAM efficiency may be defined as actual performance/peak theoretical performance such as the percentage of cycles that include a data operation of the overall number of cycles where a data operation or a control operation is performed. Such efficiency may be determined based on the percentage of a memory interface/bus in operation. For example, the efficiency may be determined based on an efficiency of the memory interface/bus corresponding to the memory. Further, DRAM utilization may refer to the percentage of cycles where the DRAM is busy (e.g., a data or control operation is performed) of the overall number of cycles where a data or control operation is performed or the DDR is idle. In some cases, software (SW) voting entities (e.g., IP cores in a SoC) vote for or request a bandwidth for DRAM access, and the SoC selects a bandwidth based on the votes. Normally, the software entities statically use a worst case efficiency factor (i.e., assuming the efficiency is low regardless of the actual efficiency in order to ensure adequate performance) in their voting formulae, leading to a higher clock frequency of the memory interface/bus (hence higher power) than required when DDR efficiency is high.

Accordingly, aspects of the present disclosure propose techniques for reducing power consumption in a device (e.g., a SoC) by dynamically accounting for memory (e.g., DRAM/DDR memory) efficiency, and keeping bus clocks at optimum levels to meet a desired performance level.

The various aspects may be implemented in a wide variety of computing systems, including single processor systems, multi-processor systems, multicore processor systems, systems-on-chip (SoC), or any combination thereof.

Figure 1:
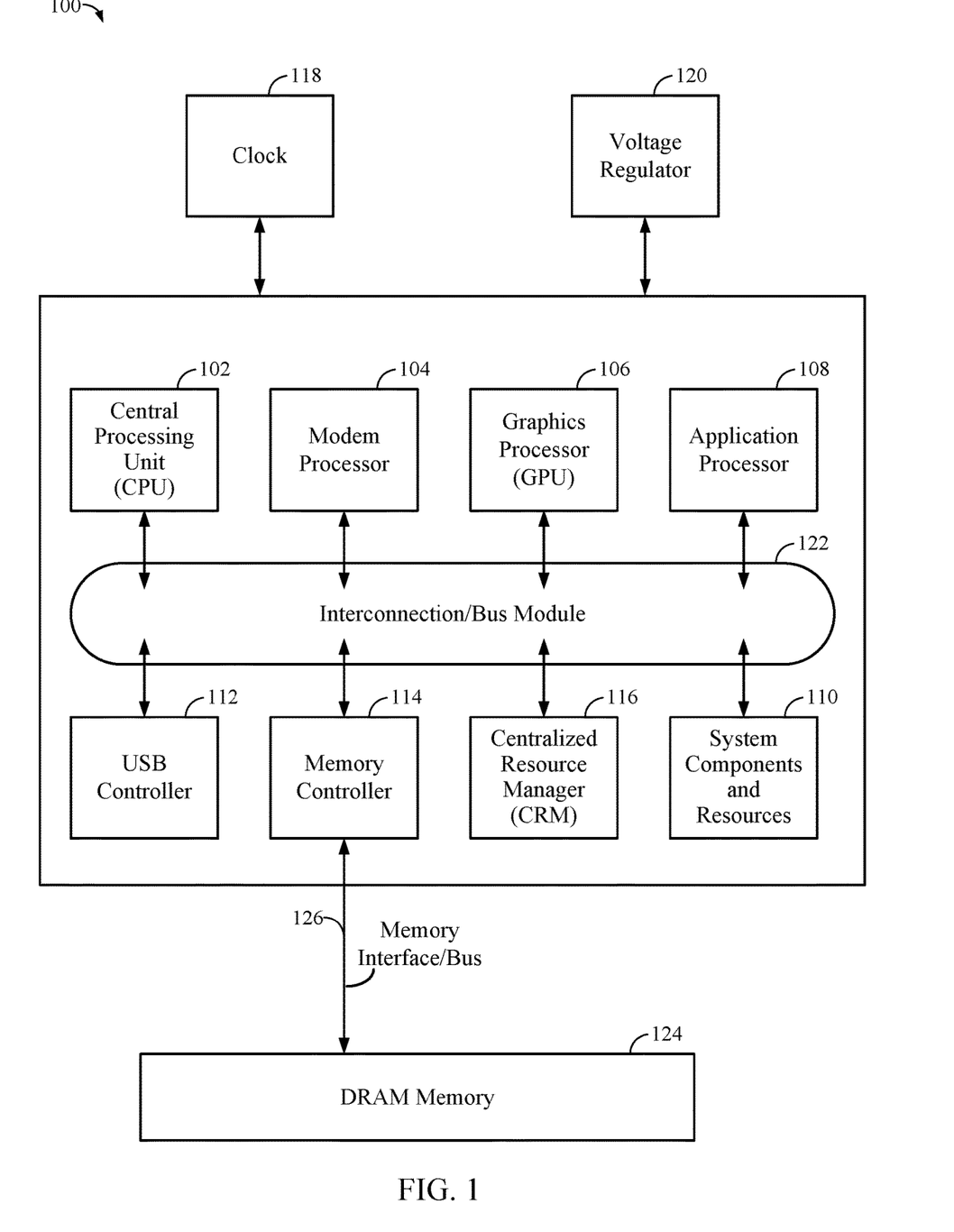
FIG. 1 is an illustration of an exemplary system-on-chip (SoC) integrated circuit design, in accordance with certain aspects of the present disclosure.

FIG. 1 illustrates example components and interconnections in a system-on-chip (SoC) 100 suitable for implementing various aspects of the present disclosure. The SoC 100 may include a number of heterogeneous processors, such as a central processing unit (CPU) 102, a modem processor 104, a graphics processor 106, and an application processor 108. Each processor 102, 104, 106, 108, may include one or more cores, and each processor/core may perform operations independent of the other processors/cores. The processors 102, 104, 106, 108 may be organized in close proximity to one another (e.g., on a single substrate, die, integrated chip, etc.) so that they may operate at a much higher frequency/clock-rate than would be possible if the signals were to travel off-chip. The proximity of the cores may also allow for the sharing of on-chip memory and resources (e.g., voltage rail), as well as for more coordinated cooperation between cores.

The SoC 100 may include system components and resources 110 for managing sensor data, analog-to-digital conversions, wireless data transmissions, and for performing other specialized operations (e.g., decoding high-definition video, video processing, etc.). System components and resources 110 may also include components such as voltage regulators, oscillators, phase-locked loops, peripheral bridges, data controllers, system controllers, access ports, timers, and other similar components used to support the processors and software clients running on the computing device. The system components and resources 110 may also include circuitry for interfacing with peripheral devices, such as cameras, electronic displays, wireless communication devices, external memory chips, etc.

The SoC 100 may further include a universal serial bus controller 112, one or more memory controllers 114 (e.g., a dynamic random access memory (DRAM) memory controller), and a centralized resource manager (CRM) 116. The SoC 100 may also include an input/output module (not illustrated) for communicating with resources external to the SoC, such as a clock 118 and a voltage regulator 120, each of which may be shared by two or more of the internal SoC components.

The processors 102, 104, 106, 108 may be interconnected to the USB controller 112, the memory controller 114, system components and resources 110, CRM 116, and other system components via an interconnection/bus module 122, which may include an array of reconfigurable logic gates and/or implement a bus architecture (e.g., CoreConnect, AMBA, etc.). Communications may also be provided by advanced interconnects, such as high performance networks-on chip (NoCs).

The interconnection/bus module 122 may include or provide a bus mastering system configured to grant SoC components (e.g., processors, peripherals, etc.) exclusive control of the bus (e.g., to transfer data in burst mode, block transfer mode, etc.) for a set duration, number of operations, number of bytes, etc. In an aspect, the bus module 130 may include a direct memory access (DMA) controller (not illustrated) that enables components connected to the bus module 122 to operate as a master component and initiate memory transactions. The bus module 122 may also implement an arbitration scheme to prevent multiple master components from attempting to drive the bus simultaneously.

The memory controller 114 may be a specialized hardware module configured to manage the flow of data to and from a DRAM memory 124 via a memory interface/bus 126. For example, the memory controller 114 may comprise one or more processors configured to perform operations disclosed herein. Examples of processors include microprocessors, microcontrollers, digital signal processors (DSPs), field programmable gate arrays (FPGAs), programmable logic devices (PLDs), state machines, gated logic, discrete hardware circuits, and other suitable hardware configured to perform the various functionality described throughout this disclosure.

Though certain aspects are described herein with respect to the memory controller 114 managing the flow of data to and from a DRAM memory 124, and to controlling the bandwidth of accessing DRAM memory 124, similar techniques may be applied to any suitable on-chip or off-chip memory (e.g., a memory on the same or a different substrate, die, integrated chip, etc., as the other components of the SoC 100). The memory controller 114 may include logic for interfacing with the DRAM memory 124, such as selecting a row and column in the DRAM memory corresponding to a memory location, reading or writing data to the memory location, etc. The memory controller 114 may include a traffic monitor (not illustrated) that monitors transaction parameters of the DRAM memory. These parameters include a number of data read/write cycles associated with the DRAM, D, a number of overhead cycles associated with the DRAM, O, and/or a number of busy cycles associated with the DRAM, B. According to aspects, the number of data read/write cycles associated with the DRAM represent the number of cycles for which there is any data related operation, the number of overhead cycles represents the number of cycles for which there is any control operation associated with the DRAM, and the number of busy cycles represents the number of cycles for which there is any data and/or overhead cycles (i.e., data+overhead cycles). In some examples, the busy cycles and control cycles presented above may correspond to the cycles of the memory interface/bus 126.

Most SoCs (e.g., an operating system executing on the SoC) provide an interface to vote for an aggregated bandwidth (MB/s) for data transfer at the DRAM memory 124 needed by IP cores (e.g., CPU, GPU, display, etc) in the SoC. The SoC typically adds up the bandwidth votes from multiple IP cores and then computes a minimum frequency to operate the memory interface/bus 126 needed for the bandwidth votes (referred to herein as DDR_BW_freq). For example, the bandwidth of the DRAM memory 124 may correspond to or be based on a frequency of operation of the memory interface/bus 126. In some aspects, the DDR_BW_freq equals the sum of all aggregated bandwidth votes from the IP cores divided by X, where X is the number of bytes the memory can transfer for each Hz. The typical SoC then picks the biggest value among this computed DDR_BW_freq and the "minimum bus bandwidth" votes made by all the IP cores.

SW voting entities (i.e., IP cores in a SoC) statically use a "worst case" efficiency factor in their bus bandwidth (BW) votes calculation that is used to calculate the bus/memory controller clock frequency used for the memory interface/bus. This static "worst case" DRAM efficiency factor leads to the system asking for more BW than required by use case, leading to a higher bus clock frequency used for the memory interface/bus 126 and higher power consumption than required when the DRAM memory is operating at a high efficiency.

Accordingly, aspects of the present disclosure propose techniques for reducing power consumption in a device (e.g., a SoC) by dynamically accounting for memory (e.g., DRAM/DDR memory) efficiency, and keeping bus clocks at optimum frequency levels to meet a desired performance level. For example, as noted above, the SoC 100 may include a centralized resource manager (CRM) 116 to achieve these functions. For example, as explained in greater detail below, the CRM 116 may monitor the efficiency of DRAM memory 124 over a defined period of time (e.g., a sample window), determine an adjusted bandwidth for the DRAM memory 124 based on the measured efficiency, and dynamically adjust a clock frequency/power of the memory interface/bus 126.

Figure 2:
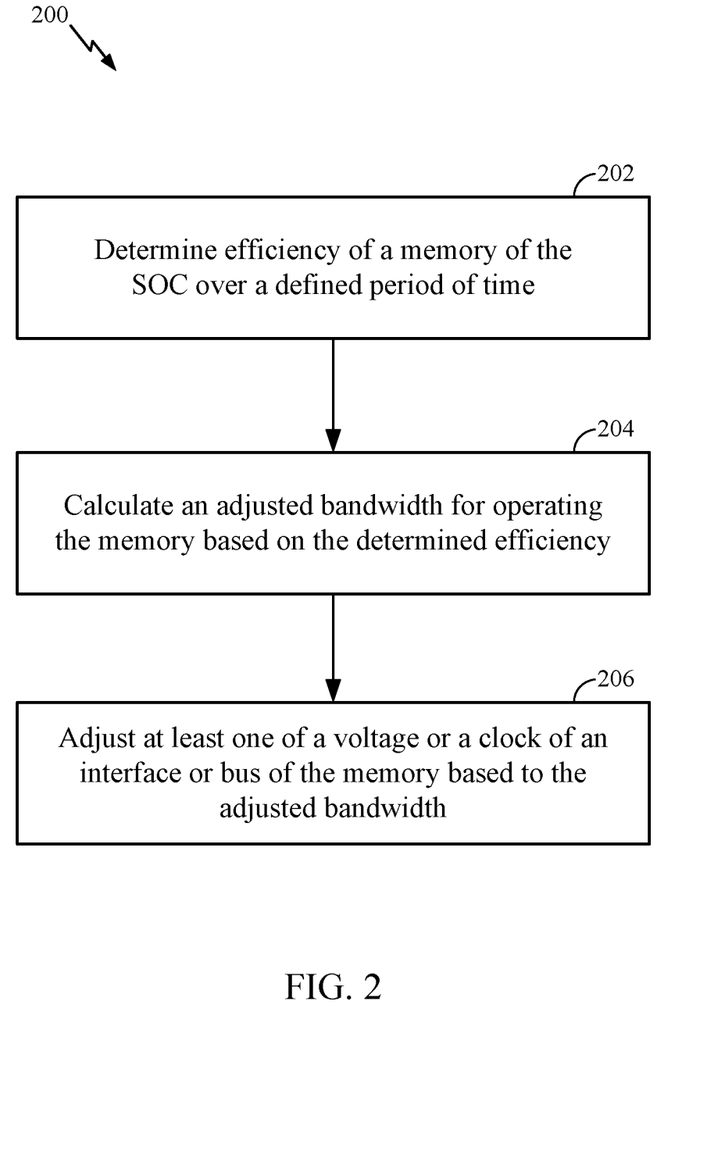
FIG. 2 illustrates example operations for operating a SoC, in accordance with certain aspects of the present disclosure.

FIG. 2 illustrates example operations 200 for operating a system on chip (SoC), for example, to improve efficiency of memory (e.g., DRAM/DDR memory) associated with the SoC and reduce power consumption. Operations 200 may be performed by one or more components on a SoC, such as a centralized resource manager (CRM) 116 and/or memory controller 114.

Operations 200 begin at 202 by determining an efficiency of a memory of the SoC over a defined period of time. At 204, the CRM calculates an adjusted bandwidth for operating the memory based on the determined efficiency. At 206, the CRM adjusts at least one of a voltage or a clock frequency of the memory interface/bus to the memory based on the determined adjusted bandwidth. For example, in some cases, as efficiency of the memory increases the voltage/clock frequency of the memory interface/bus (e.g., the memory interface/bus 126) may be decreased and when efficiency of the memory decreases, the voltage/clock of the memory interface/bus (e.g., the memory interface/bus 126) may be increased.

In some cases, determining the adjusted bandwidth may only be performed when a measured compensation factor (e.g., 100—determined efficiency) is outside of a particular defined range (e.g., above a first threshold or below a second threshold). For example, in some cases, operations 200 may also include determining whether the measured compensation factor is above a first threshold or below a second threshold during the defined period of time. In this case, the CRM may further determine the adjusted bandwidth based, at least in part, on this determination. For example, only if the measured compensation factor is outside of a range defined by the first and second thresholds may the CRM determine the adjusted bandwidth and adjust the voltage and clock frequency, for example, of the memory interface/bus. According to aspects, this is to prevent the BW of the DRAM memory, and hence voltage/clock frequency of the memory interface/bus, from repeatedly changing when the change in efficiency of the DRAM memory is small. In other words, only when the efficiency changes by a certain amount (e.g., defined by the upper and lower thresholds) will the BW of the DRAM memory and accordingly voltage/clock frequency of the memory interface/bus, be changed. This process will be explained in greater detail below with reference to FIG. 4.

Figure 3:
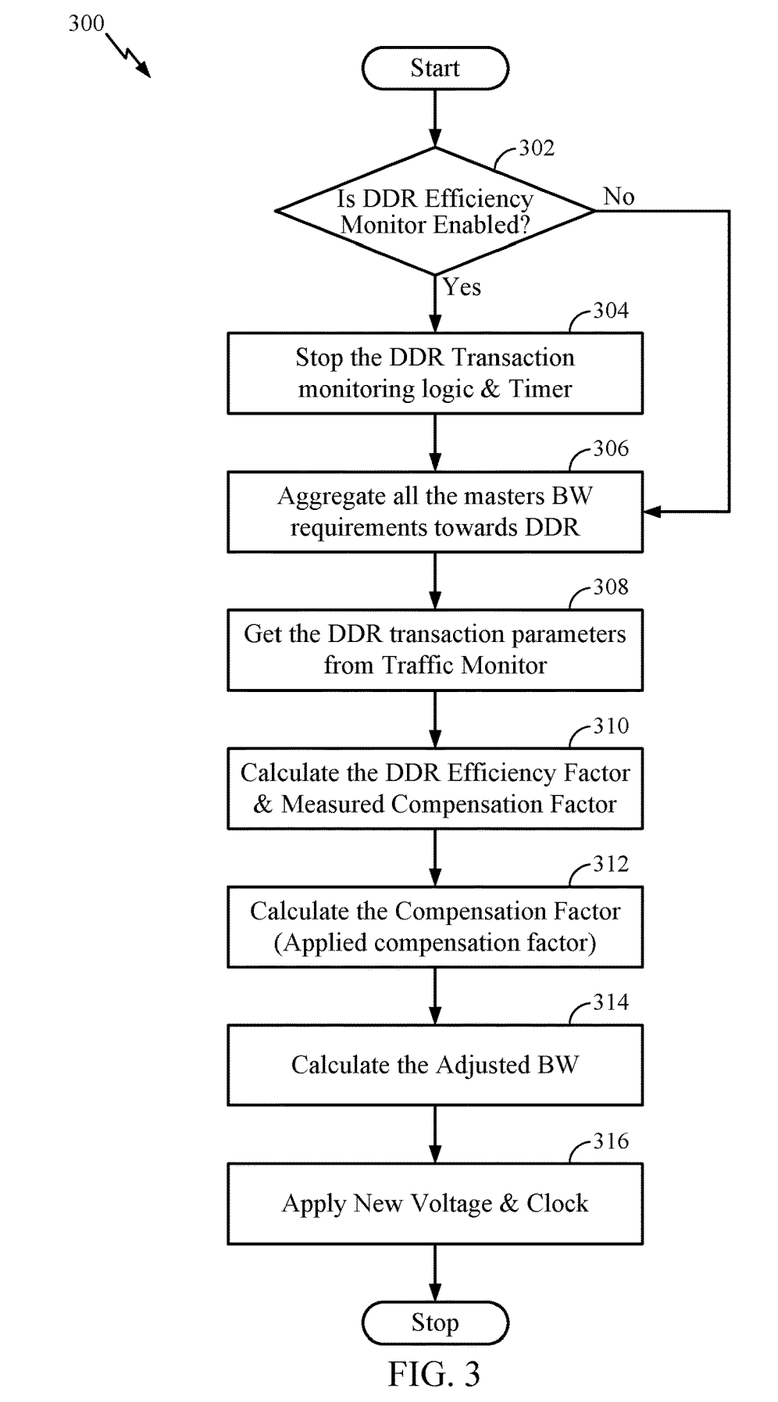
FIG. 3 is a flow diagram illustrating a process for reducing power consumption in a SoC, in accordance with certain aspects of the present disclosure.
Figure 4:
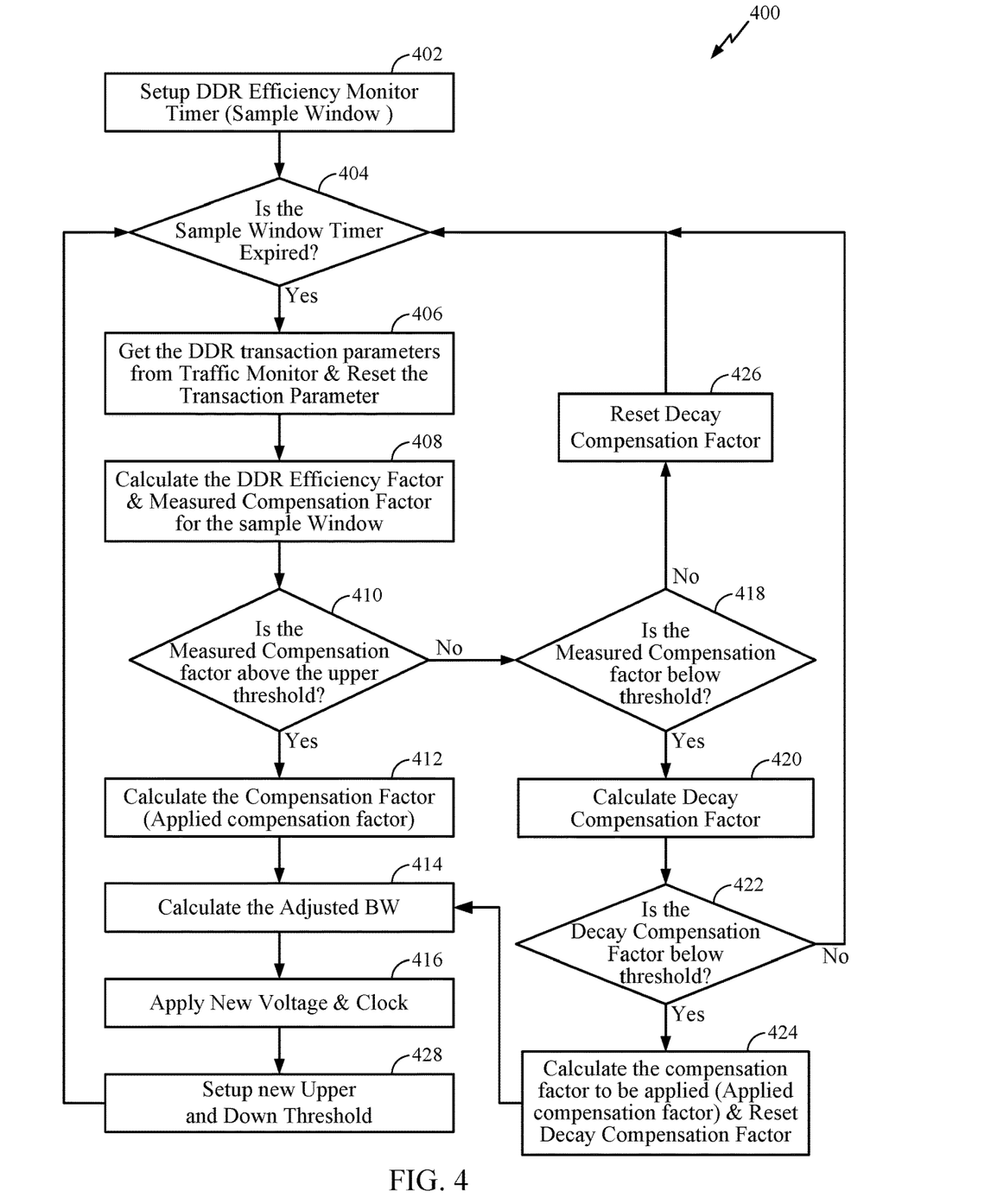
FIG. 4 is a flow diagram illustrating a process for reducing power consumption in a SoC, in accordance with certain aspects of the present disclosure.

As noted, the efficiency of DRAM memory may be monitored over a period of time. This efficiency may then be used to determine an adjusted bandwidth for operating the DRAM memory. Based on this adjusted bandwidth, a clock frequency and/or voltage of the memory interface/bus may be adjusted to reduce power consumption. FIGS. 3 and 4 provide a more detailed explanation of these techniques.

FIG. 3 is a flow diagram illustrating a process 300 for reducing power consumption in a SoC. In some cases, process 300 may be performed to determine an initial operating BW for the DRAM memory. According to aspects, the process illustrated in FIG. 3 may be performed by one or more components on a SoC (e.g., SoC 100), such as a centralized resource manager (CRM) 116 and/or memory controller 114. For example, as discussed, various IP cores of the SoC may request/vote for bandwidth, and the CRM 116 may aggregate the votes and determine an adjusted bandwidth for the DRAM memory 124.

The process 300 begins at 302 by determining whether a DRAM efficiency monitor (i.e., a logical entity within the CRM 116) is enabled or not. If the DRAM efficiency monitor is enabled, at 304 the CRM may transmit a request (e.g., via interconnection/bus module 122) to the memory controller 114 to stop the DRAM transaction monitoring by the traffic monitor in the memory controller 114. The CRM 116 may also stop a timer used by the CRM 116 to keep track of a defined period of time for monitoring efficiency of the DRAM memory.

If at 302 it is determined that the DRAM efficiency monitor is not enabled, the process moves to 306. At 306, the CRM 116 aggregates (e.g., sums) a number of received BW requests (e.g., votes) from the IP cores on the SoC 100 (e.g., processors 102, 104, 106, 108) to determine a total DRAM BW requested (BWR) by the IP cores.

At 308, the CRM 116 may receive the transaction parameters monitored by the traffic monitor in the memory controller 114, if any. According to certain aspects, receiving the transaction parameters may be in response to a request transmitted by the CRM 116 to the memory controller 114 for the transaction parameters.

At 310, the CRM 116 calculates an efficiency factor (EF) for the DRAM memory and a measured compensation factor (MCF), for example, using the received transaction parameters. For example, the CRM 116 may calculate the efficiency factor for the DRAM memory according to: $EF=D*100/D+O)$, where D is the number of cycles for which there is any data operation associated with the DRAM memory during a defined period of time and O is the number of cycles for which there is any control operation associated with the DRAM memory during the defined period of time, as noted above. In some cases, if there are no transaction parameters (e.g., which might be the case of a first running of the process 300), CRM may use a "worst case" efficiency factor. Additionally, according to aspects, the CRM 116 may calculate the measured compensation factor according to: $MCF=(100/EF)*100-100$. According to aspects, the measured compensation factor represents a measure of inefficiency of the DRAM memory and represents an extra compensation factor needed due to the inefficiency of the DRAM. For example, assume that a DRAM BW request is 10 GBPS and the current DRAM efficiency is 80%. If no compensation factor (e.g., MCF) is applied, the DRAM will only support 8 GBPS. Thus, the required compensation factor (i.e., MCF) at this efficiency is another 25% (e.g., 25% of 8 GPS is an additional 2 GBPS to reach 10 GBPS).

At 312, CRM 116 determines an applied compensation factor (ACF), for example, based on a guard compensation factor (GCF) and the MCF determined at 310. According to aspects, because the efficiency factor of the DRAM is calculated over a window of time (i.e., the defined period of time) and a compensation factor is applied (i.e., ACF), there is a small period of time that the DRAM may run at a lower BW requirement than what is actually needed. According to aspects, the guard compensation factor (e.g., an additional compensation factor that depends on a particular use case of the SoC) is used in the calculation of the applied compensation factor to avoid any performance degradation due to DRAM efficiency reduction during the small period of time. Thus, CRM 116 may determine the applied compensation factor according to: $ACF=(GCF+MCF)$.

At 314, CRM 116 determines an adjusted bandwidth (ABW) for the DRAM memory to use to reduce power consumption. The adjusted bandwidth may be determined based on the applied compensation factor and the total BW requested/required by the clients on the SoC 100 (i.e., processors 102, 104, 106, 108). For example, CRM 116 may determine the adjusted bandwidth according to: ABW=(ACF*BWR/100)+BWR.

At 316, based on the determined adjusted bandwidth, CRM 116 determines and applies new voltage and clock frequency levels of the memory interface/bus 126, for example, to reduce power consumption at the DRAM memory. According to aspects, applying the new voltage level and clock frequency may involve CRM 116 instructing clock 118 and voltage regulator 120 to alter their respective outputs accordingly. For example, as efficiency of the DRAM memory increases, CRM 116 may instruct clock 118 to decrease a clock frequency of the memory interface/bus 126 and the voltage regulator 120 to reduce a voltage of the memory interface/bus 126. If efficiency of the DRAM memory decreases, CRM 116 may instruct clock 118 to increase a clock frequency of the memory interface/bus 126 and the voltage regulator 120 to increase a voltage of the memory interface/bus 126.

FIG. 4 is a flow diagram illustrating a process 400 for reducing power consumption in a SoC, for example, autonomously using a memory efficiency monitor (e.g., a logical entity in the CRM 116). According to aspects, process 400 may be used once an initial operating BW for the DRAM memory is determined (e.g., as illustrated in FIG. 3).

At 402, CRM 116 configures a DRAM memory efficiency timer, establishing a sample window over which efficiency of the DRAM memory will be monitored. According to aspects, during this sample window the traffic monitor in the memory controller 114 will record the transaction parameters described above.

At 404, CRM 116 determines whether the DRAM memory efficiency timer has expired. According to aspects, if the DRAM memory efficiency timer has not expired, process 400 stays at 404. However, if the DRAM memory efficiency timer is expired, at 406, CRM 116 retrieves the DRAM memory transaction parameters from the memory controller 114 corresponding to the previous sample window. CRM 116 then instructs memory controller 114 to reset the DRAM memory transaction parameters. Additionally, CRM 116 resets the DRAM memory efficiency timer for a next sample window.

At 408, CRM 116 calculates the DRAM efficiency factor, EF, and the measured compensation factor, MCF, for the previous sample window, for example, according to aspects described above with respect to step 310.

At 410, CRM 116 determines whether the measured compensation factor is above an upper threshold (e.g., a first threshold). According to aspects, if the measured compensation factor is above the upper threshold (e.g., indicating poor efficiency), CRM 116 calculates the applied compensation factor (ACF) at 412 (e.g., as described above with respect to step 312), calculates the adjusted bandwidth (ABW) for the DRAM memory at 414 (e.g., as described above with respect to step 314), and determines and applies the new voltage level and clock frequency of the memory interface/bus at 416 (e.g., as described above with respect to step 316).

According to aspects, if at 410, the measured compensation factor is not above the upper threshold, at 418, CRM 116 determines whether the measured compensation factor is below a lower threshold (e.g., a second threshold). According to aspects and as noted above, the purpose of the upper and lower thresholds is to prevent the BW of the DRAM memory, and hence voltage/clock of the memory interface/bus, from repeatedly changing when the change in efficiency of the DRAM memory is small. In other words, only when the efficiency changes by a certain amount (e.g., defined by the upper and lower thresholds) will the BW of the DRAM memory (and voltage/clock of the memory interface/bus) be changed.

According to aspects, if the measured compensation factor is below the lower threshold, at 420, CRM 116 calculates a decay compensation factor (DCF) that indicates how quickly the voltage and clock of the memory interface/bus may be adjusted. According to aspects, the purpose of the decay compensation factor is to prevent situations that could occur if a voltage/clock frequency of the memory interface/bus is reduced due to improved efficiency too quickly. For example, if the voltage/clock frequency of the memory interface/bus is reduced too quickly, there may be instances where this reduced voltage/clock frequency may not be enough to handle a sudden decrease in efficiency.

According to aspects, CRM 116 may determine the decay compensation factor based on a DCF of a previous sample window (PDCF), the applied compensation factor (ACF), the measured compensation factor (MCF), the guard compensation factor (GCF), and a desired decay rate (DR). For example, CRM 116 may determine the DCF=PDCF−(ACF−MCF−GCF)*DR. According to aspects, when running process 400 for a first time, the PDCF may be equal to: PDCF=ACF−GCF. According to aspects, CRM 116 may signal the DCF to the clock 118 and voltage regulator 120. Clock 118 and voltage regulator 120 may in turn adjust their respective outputs in accordance with the DCF (e.g., at step 416). According to certain aspects, the decay rate may be a value tuned based on a specific use case of the SoC. For example when the SoC is running in performance mode, the decay rate can be configured as a very low value, so it takes more time to reduce the clock frequency/voltage. According to aspects, when the SoC is operating in a power save mode, the decay rate can be configured as a high value so reduction of voltage and clock frequency is faster.

At 422, CRM 116 determines whether the decay compensation factor is below a DCF threshold (e.g., a third threshold). According to aspects, if the decay compensation factor is below the DCF threshold, at 424, CRM 116 calculates the applied compensation factor (ACF) (e.g., as described above with respect to step 312) and resets the decay compensation factor for a future sample window. After 422, process 400 then continues at 414, as described above. If, however, the decay compensation factor is above the DCF threshold at 422, then process 400 returns to 404. According to aspects, the purpose of determining whether the decay compensation factor is below the DCF threshold is to determine whether a decay process is complete. For example, if the decay process is complete (i.e., the decay compensation factor is below the DCF threshold), the process moves to 414 where the adjusted bandwidth is calculated. However, if the decay process is not complete, the process moves back to 404 and waits for the expiry of a next sample window. According to aspects, this process of returning to 404 from 422 will continue until the decay process is complete. As noted above, the determination of whether the decay process is complete (i.e., determining whether the decay compensation factor is below the DCF threshold) is to ensure that the adjusted bandwidth is not applied too quickly.

Returning to 418, if the measured compensation factor is not below the lower threshold (and also not above the upper threshold), at 426, CRM 116 resets the decay compensation factor (if non-zero) for a future sample window. After 424, process 400 then returns to 404.

According to aspects, returning to 416, after CRM 116 applies the new voltage level and clock frequency to memory interface/bus 126, process 400 continues at 428. For example, at 428, CRM 116 determines a new upper threshold and lower threshold for the measured compensation factor, for example, to be used at 410 and 418 for a future sample window. Process 400 then returns to 402.

Figure 5:
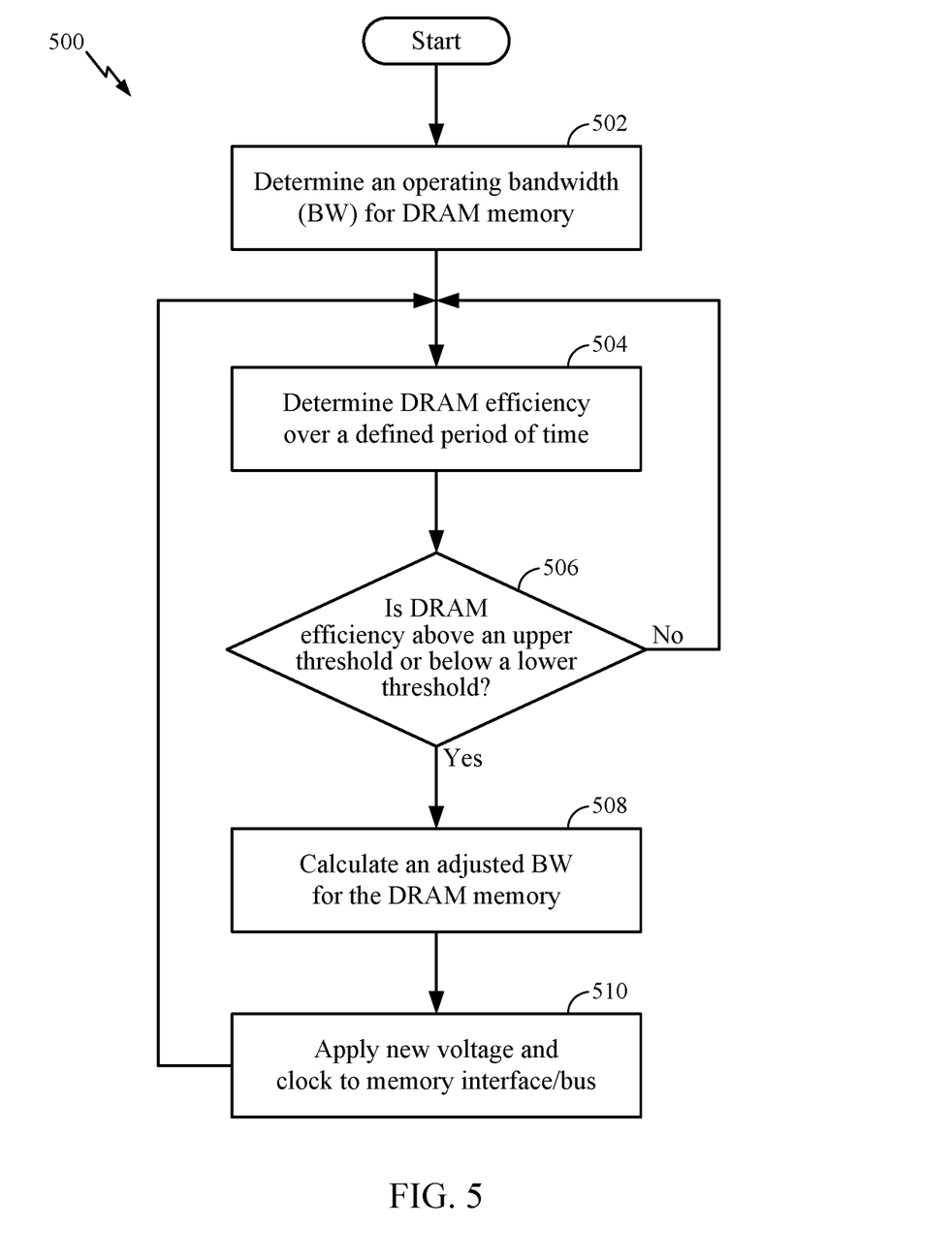
FIG. 5 is a flow diagram illustrating a process for reducing power consumption in a SoC, in accordance with certain aspects of the present disclosure.

FIG. 5 is a flow diagram illustrating a process 500 for reducing power consumption in a SoC. In some cases, process 500 may be performed by a central resource manager in the SoC (e.g., CRM 116).

At 502, CRM 116 determines an operating BW for the DRAM memory 124. As noted above, the operating BW may be determined based, at least in part, on a number of received BW requests (e.g., votes) from the IP cores on the SoC 100 (e.g., processors 102, 104, 106, 108).

At 504, CRM 116 determines an efficiency of the DRAM memory 124 over a defined period of time (e.g., a sample window). For example, as noted above, CRM 116 may configure a DRAM memory efficiency timer, establishing a sample window over which efficiency of the DRAM memory will be monitored. According to aspects, during this sample window the traffic monitor in the memory controller 114 will record the transaction parameters described above. After expiration of the DRAM memory efficiency timer, CRM 116 may receive transaction parameters from the memory controller and determine the efficiency of the DRAM memory based, at least in part, on these transaction parameters, as described above.

At 506, CRM 116 determines whether the determined efficiency of the DRAM memory is above an upper threshold or below a lower threshold. If the determined efficiency is not above the upper threshold or below the lower threshold, process 500 returns to 504 and the CRM 116 again determines the efficiency of the DRAM memory 124 over a subsequent sample window.

If, however, the determined efficiency is above the upper threshold or below the lower threshold, process 500 continues to 508. For example, at 508, CRM 116 determines an adjusted bandwidth for the DRAM memory 124, for example, using techniques described above. Additionally, while not illustrated, CRM 116 may also reset the upper and lower threshold (e.g., to new values), which, in some cases, may be functions of the determined efficiency.

At 510, CRM 116 applies a new voltage level and/or clock frequency to the memory interface/bus 126 based on the adjusted bandwidth. The new voltage level and clock frequency may be based on or a function of the determined efficiency. The process 500 then returns to 504 where the CRM 116 again determines the efficiency of the DRAM memory 124 over a subsequent sample window.

According to aspects, the processes described above reduce the memory efficiency effects on a SoC by monitoring changes in the memory efficiency periodically over a sample window and compensating the bandwidth requirement on demand. Aspects of the present disclosure ensure performance of the SoC is not impacted while power consumption in the SoC is reduced. Additionally, aspects of the present disclosure improve a SoCs thermal capacity (e.g., less power consumed=less thermal energy emitted).

In some configurations, the term(s) 'communicate,' 'communicating,' and/or 'communication' may refer to 'receive,' 'receiving,' 'reception,' and/or other related or suitable aspects without necessarily deviating from the scope of the present disclosure. In some configurations, the term(s) 'communicate,' 'communicating,' 'communication,' may refer to 'transmit,' 'transmitting,' 'transmission,' and/or other related or suitable aspects without necessarily deviating from the scope of the present disclosure.

Within the present disclosure, the word "exemplary" is used to mean "serving as an example, instance, or illustration." Any implementation or aspect described herein as "exemplary" is not necessarily to be construed as preferred or advantageous over other aspects of the disclosure. Likewise, the term "aspects" does not require that all aspects of the disclosure include the discussed feature, advantage or mode of operation. The term "coupled" is used herein to refer to the direct or indirect coupling between two objects. For example, if object A physically touches object B, and object B touches object C, then objects A and C may still be considered coupled to one another—even if they do not directly physically touch each other. For instance, a first object may be coupled to a second object even though the first object is never directly physically in contact with the second object. The terms "circuit" and "circuitry" are used broadly, and intended to include both hardware implementations of electrical devices and conductors that, when connected and configured, enable the performance of the functions described in the present disclosure, without limitation as to the type of electronic circuits.

One or more of the components, steps, features and/or functions illustrated herein may be rearranged and/or combined into a single component, step, feature or function or embodied in several components, steps, or functions. Additional elements, components, steps, and/or functions may also be added without departing from novel features disclosed herein. The apparatus, devices, and/or components illustrated herein may be configured to perform one or more of the methods, features, or steps described herein. The novel algorithms described herein may also be efficiently implemented in software and/or embedded in hardware.

It is to be understood that the specific order or hierarchy of steps in the methods disclosed is an illustration of exemplary processes. Based upon design preferences, it is understood that the specific order or hierarchy of steps in the methods may be rearranged. The accompanying method claims present elements of the various steps in a sample order, and are not meant to be limited to the specific order or hierarchy presented unless specifically recited therein.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but are to be accorded the full scope consistent with the language of the claims, wherein reference to an element in the singular is not intended to mean "one and only one" unless specifically so stated, but rather "one or more." Unless specifically stated otherwise, the term "some" refers to one or more. A phrase referring to "at least one of a list of" items refers to any combination of those items, including single members. As an example, "at least one of: a, b, or c" is intended to cover: a; b; c; a and b; a and c; b and c; and a, b and c. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed under the provisions of 35 U.S.C. § 112(f) unless the element is expressly recited using the phrase "means for" or, in the case of a method claim, the element is recited using the phrase "step for." For example, referring to the SoC 100, the CRM 116 may include a memory efficiency determination component or one or more components to provide the means for determining an efficiency of memory. Additionally, CRM 116 may include an adjusted bandwidth calculation component or one or more components to provide the means for calculating. Further, CRM may include a voltage/clock adjustment component or one or more components to provide the means for adjusting. In some cases, clock 118 may provide means for adjusting a clock and voltage regulator 120 may provide means for adjusting a voltage.

These apparatus and methods described in the detailed description and illustrated in the accompanying drawings by various blocks, modules, components, circuits, steps, processes, algorithms, etc. (collectively referred to as "elements"). These elements may be implemented using hardware, software, or combinations thereof. Whether such elements are implemented as hardware or software depends upon the particular application and design constraints imposed on the overall system.

By way of example, an element, or any portion of an element, or any combination of elements may be implemented with a "processing system" that includes one or more processors. Examples of processors include microprocessors, microcontrollers, digital signal processors (DSPs), field programmable gate arrays (FPGAs), programmable logic devices (PLDs), state machines, gated logic, discrete hardware circuits, and other suitable hardware configured to perform the various functionality described throughout this disclosure. One or more processors in the processing system may execute software. Software shall be construed broadly to mean instructions, instruction sets, code, code segments, program code, programs, subprograms, software modules, applications, software applications, software packages, firmware, routines, subroutines, objects, executables, threads of execution, procedures, functions, etc., whether referred to as software, firmware, middleware, microcode, hardware description language, or otherwise.

Accordingly, in one or more exemplary embodiments, the functions described may be implemented in hardware, software, or combinations thereof. If implemented in software, the functions may be stored on or encoded as one or more instructions or code on a computer-readable medium. Computer-readable media includes computer storage media. Storage media may be any available media that can be accessed by a computer. By way of example, and not limitation, such computer-readable media can comprise RAM, ROM, EEPROM, PCM (phase change memory), flash memory, CD-ROM or other optical disk storage, magnetic disk storage or other magnetic storage devices, or any other medium that can be used to carry or store desired program code in the form of instructions or data structures and that can be accessed by a computer. Disk and disc, as used herein, includes compact disc (CD), laser disc, optical disc, digital versatile disc (DVD), floppy disk and Blu-ray disc where disks usually reproduce data magnetically, while discs reproduce data optically with lasers. Combinations of the above should also be included within the scope of computer-readable media.

What is claimed is:

1. A method of operating a system on chip (SoC), comprising:
    determining an efficiency ratio of a memory of the SoC over a defined period of time;
    calculating an adjusted bandwidth for operating the memory based on the determined efficiency ratio;
    determining a measured compensation factor (MCF) based on the determined efficiency ratio;
    determining, when the MCF is below a lower threshold during the defined period of time, a decay compensation factor for adjusting a voltage of the memory or a clock of the memory, wherein the decay compensation factor comprises a rate at which to adjust at least one of the voltage of the memory or the clock of the memory; and
    adjusting at least one of the voltage of the memory or the clock of the memory corresponding to the adjusted bandwidth, wherein the adjusting comprises adjusting the at least one of the voltage of the memory or the clock of the memory according to the rate indicated by the decay compensation factor.

2. The method of claim 1, wherein calculating the adjusted bandwidth is further based on the determination of whether the determined efficiency ratio is above a first threshold or below a second threshold during the defined period of time.

3. The method of claim 1, wherein determining the efficiency ratio of the memory is based on a number of data cycles of the memory recorded during the defined period of time and a number of overhead cycles of the memory recorded during the defined period of time.

4. The method of claim 1, wherein the adjusted bandwidth is calculated based, at least in part, on an applied compensation factor and a total bandwidth requested by one or more processing entities in the SoC, wherein the applied compensation factor is a value that compensates for an efficiency loss at the memory.

5. The method of claim 1, wherein determining the efficiency ratio of the memory of the SoC over the defined period of time comprises determining an efficiency ratio of a memory bus coupled with the memory.

6. The method of claim 1, wherein adjusting the at least one of the voltage of the memory or the clock of the memory comprises adjusting a voltage of a memory bus coupled with the memory or a clock of the memory bus coupled with the memory.

7. The method of claim 1, wherein determining the efficiency ratio comprises determining a percentage of cycles that include a data operation to an overall number of cycles where a data operation or a control operation is performed.

8. The method of claim 1, wherein a value of the rate indicated by the decay compensation factor depends on a use-case of the SOC.

9. The method of claim 8, wherein:
    for a performance mode use-case of the SOC, the value of the rate comprises a value that increases the amount of time to adjust the at least one of the voltage of the memory or the clock of the memory; and
    for a power-save mode use-case the value of the rate comprises a value that decreases the amount of time to adjust the at least one of the voltage of the memory or the clock of the memory.

10. The method of claim 1, wherein determining the decay compensation factor comprises:

determining an applied compensation factor (ACF) based, at least in part, on the MCF and a guard compensation factor (GCF), wherein:
   the guard compensation factor depends on a use-case of the SOC and comprises a value for avoiding performance degradation of the memory during a second period in time at which the memory runs at a lower bandwidth requirement than what the memory required; and
   the MCF represents a measure of inefficiency of the memory; and
determining the decay compensation factor according to: PDCF−(ACF-MCF-GCF)*DR, wherein:
   the PDCF comprises a decay compensation factor for a previous period of time; and
   the DR comprises a desired decay rate; and
   the DR is based on the use-case of the SOC.

11. An apparatus, comprising:
a memory;
a memory controller configured to:
   determine an efficiency ratio of the memory over a defined period of time;
   calculate an adjusted bandwidth for operating the memory based on the determined efficiency ratio;
   determine a measured compensation factor (MCF) based on the determined efficiency ratio;
   determine, when the MCF is below a lower threshold during the defined period of time, a decay compensation factor for adjusting a voltage of the memory or a clock of the memory, wherein the decay compensation factor comprises a rate at which to adjust at least one of the voltage of the memory or the clock of the memory; and
   adjust at least one of the voltage of the memory or the clock of the memory corresponding to the adjusted bandwidth, wherein the memory controller is further configured to adjust the at least one of the voltage of the memory or the clock of the memory according to the rate indicated by the decay compensation factor; and
a memory bus coupled between the memory and memory controller.

12. The apparatus of claim 11, wherein the memory controller is configured to calculate the adjusted bandwidth based on the determination of whether the determined efficiency ratio is above a first threshold or below a second threshold during the defined period of time.

13. The apparatus of claim 11, wherein the memory controller is configured to determine the efficiency ratio of the memory based on a number of data cycles of the memory recorded during the defined period of time and a number of overhead cycles of the memory recorded during the defined period of time.

14. The apparatus of claim 11, wherein the memory controller is configured to calculate the adjusted bandwidth based, at least in part, on an applied compensation factor and a total bandwidth requested by one or more processing entities in the apparatus, wherein the applied compensation factor is a value that compensates for an efficiency loss at the memory.

15. The apparatus of claim 11, wherein the memory controller is configured to determine the efficiency ratio of the memory over the defined period of time by determining an efficiency ratio of the memory bus coupled between the memory controller and the memory.

16. The apparatus of claim 11, wherein the memory controller is configured to adjust the at least one of the voltage of the memory or the clock of the memory by adjusting a voltage of a memory bus coupled with the memory or a clock of the memory bus coupled with the memory.

17. The apparatus of claim 11, wherein the apparatus comprises mobile computing device.

18. An apparatus, comprising:
at least one processor;
a memory coupled with the at least one processor, wherein the at least one processor is configured to:
   determine an efficiency ratio of the memory over a defined period of time;
   calculate an adjusted bandwidth for operating the memory based on the determined efficiency ratio;
   determine a measured compensation factor (MCF) based on the determined efficiency ratio;
   determine, when the MCF is below a lower threshold during the defined period of time, a decay compensation factor for adjusting a voltage of the memory or a clock of the memory, wherein the decay compensation factor comprises a rate at which to adjust at least one of the voltage of the memory or the clock of the memory; and
   adjust at least one of the voltage of the memory or the clock of the memory corresponding to the adjusted bandwidth, wherein the at least one processor is further configured to adjust the at least one of the voltage of the memory or the clock of the memory according to the rate indicated by the decay compensation factor.

19. The apparatus of claim 18, wherein the at least one processor is further configured to:
   calculate the adjusted bandwidth based further on the determination of whether the determined efficiency ratio is above a first threshold or below a second threshold during the defined period of time.

20. The apparatus of claim 18, wherein the at least one processor is further configured to determine the efficiency ratio of the memory based on a number of data cycles of the memory recorded during the defined period of time and a number of overhead cycles of the memory recorded during the defined period of time.

21. The apparatus of claim 18, wherein the at least one processor is further configured to calculate the adjusted bandwidth based, at least in part, on an applied compensation factor and a total bandwidth requested by one or more processing entities, wherein the applied compensation factor is a value that compensates for an efficiency loss at the memory.

22. The apparatus of claim 18, wherein the at least one processor is further configured to determine the efficiency ratio of the memory over the defined period of time by determining an efficiency ratio of a memory bus coupled with the memory.

23. The apparatus of claim 18, wherein the at least one processor is further configured to adjust the at least one of the voltage of the memory or the clock of the memory by adjusting a voltage of a memory bus coupled with the memory or a clock of the memory bus coupled with the memory.

24. An apparatus, comprising:
means for determining an efficiency ratio of a memory in the apparatus over a defined period of time;
means for calculating an adjusted bandwidth for operating the memory based on the determined efficiency ratio;
means for determining a measured compensation factor (MCF) based on the determined efficiency ratio;

means for determining, when the MCF is below a lower threshold during the defined period of time, a decay compensation factor for adjusting a voltage of the memory or a clock of the memory, wherein the decay compensation factor comprises a rate at which to adjust at least one of the voltage of the memory or the clock of the memory; and means for adjusting at least one of the voltage of the memory or the clock of the memory corresponding to the adjusted bandwidth, wherein the means for adjusting are further configured to adjust the at least one of the voltage of the memory or the clock of the memory according to the rate indicated by the decay compensation factor.

25. The apparatus of claim 24, wherein the means for adjusting comprise means for adjusting the bandwidth based on the determination of whether the determined efficiency ratio is above a first threshold or below a second threshold during the defined period of time.

26. The apparatus of claim 24, wherein the means for calculating comprise means for calculating the adjusted bandwidth based, at least in part, on an applied compensation factor and a total bandwidth requested by one or more processing entities in the apparatus, wherein the applied compensation factor is a value that compensates for an efficiency loss at the memory.

* * * * *